No. 690,601. Patented Jan. 7, 1902.
G. O. MORRIS.
DEVICE FOR AUTOMATICALLY INFLATING PNEUMATIC TIRES.
(Application filed Aug. 22, 1901.)
(No Model.) 2 Sheets—Sheet 1.
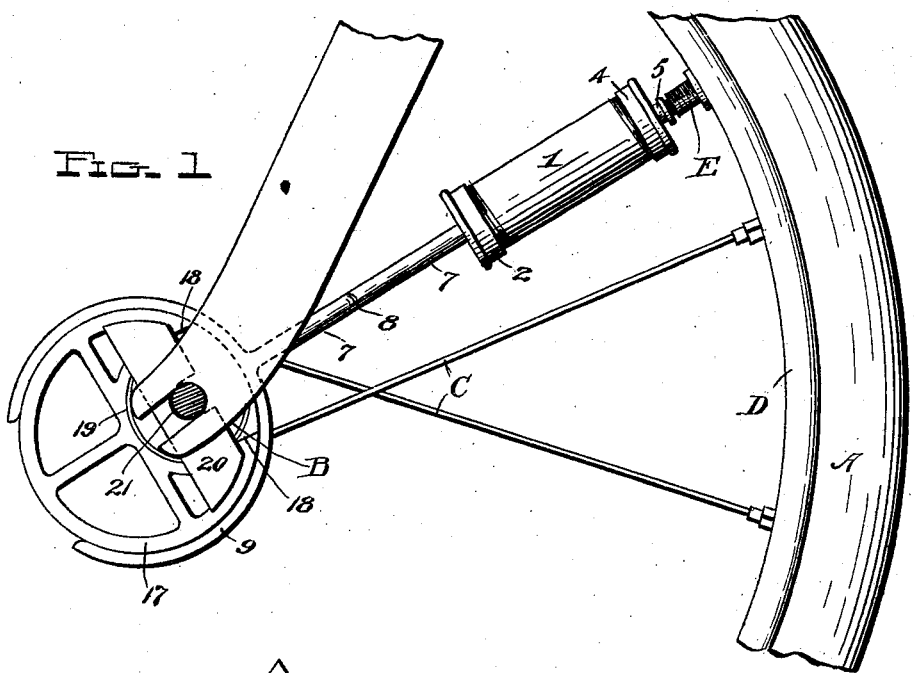
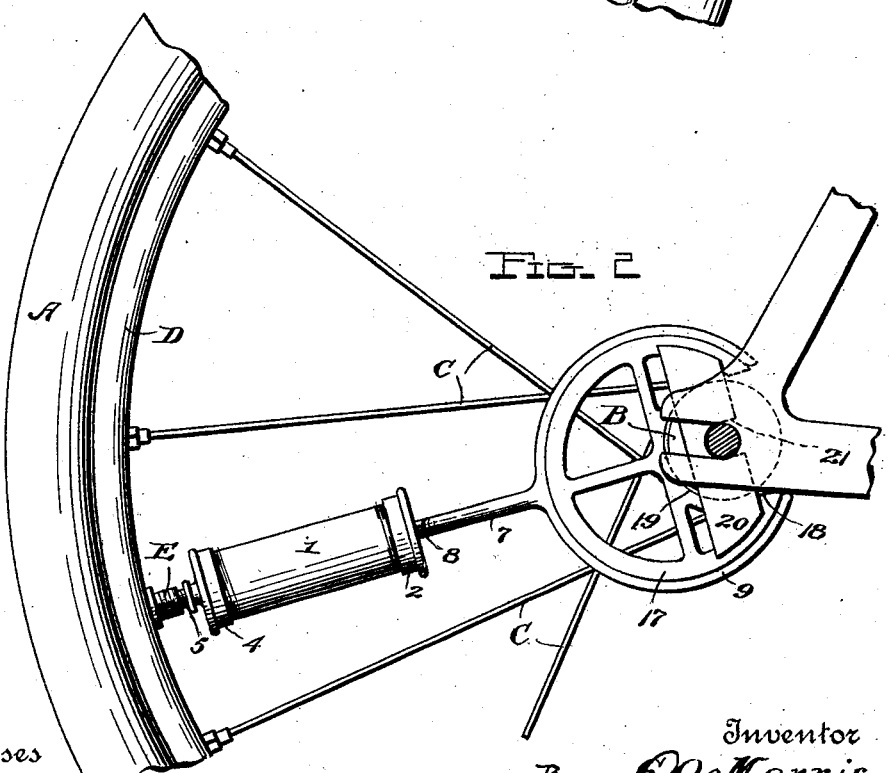
Witnesses
Inventor
G. O. Morris
Attorney No. 690,601. Patented Jan. 7, 1902.
G. O. MORRIS.
DEVICE FOR AUTOMATICALLY INFLATING PNEUMATIC TIRES.
(Application filed Aug. 22, 1901.)
(No Model.) 2 Sheets—Sheet 2.
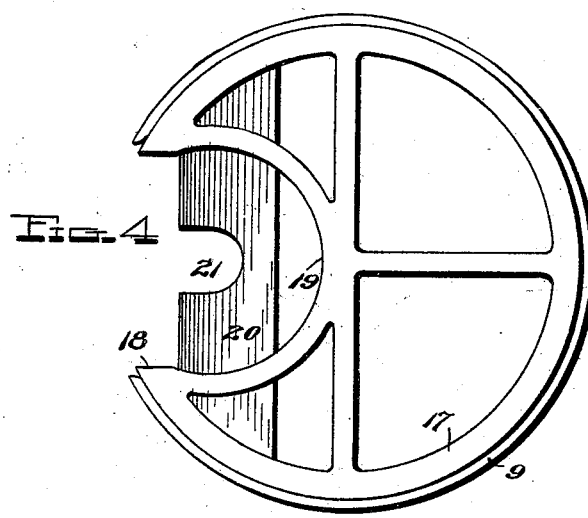
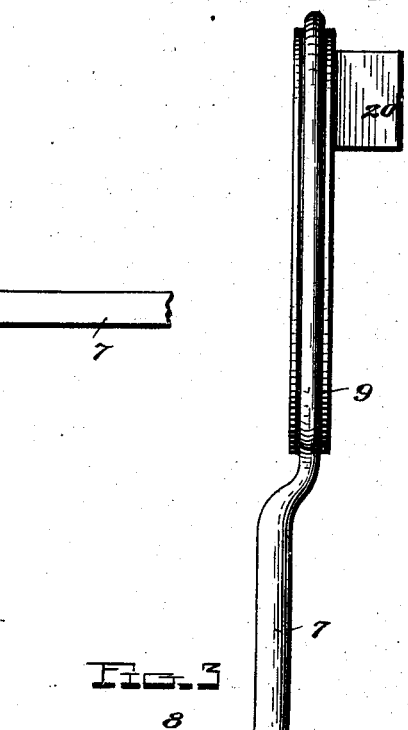
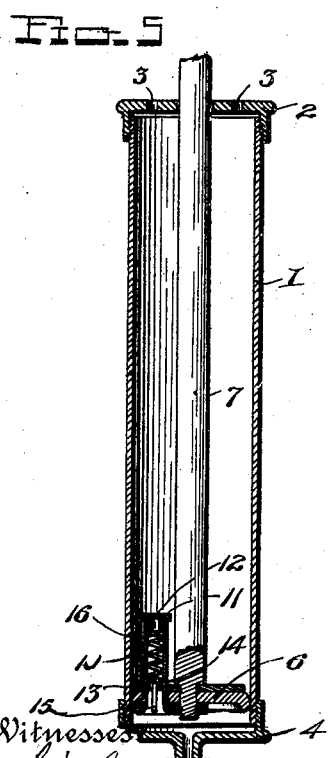
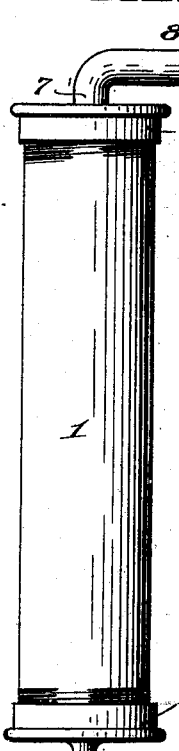

UNITED STATES PATENT OFFICE.

GEORGE O. MORRIS, OF MOLINE, ILLINOIS, ASSIGNOR OF TWO-THIRDS TO SAMUEL S. CROMPTON AND GEORGE H. McKINSEY, OF MOLINE, ILLINOIS.

DEVICE FOR AUTOMATICALLY INFLATING PNEUMATIC TIRES.

SPECIFICATION forming part of Letters Patent No. 690,601, dated January 7, 1902.

Application filed August 22, 1901. Serial No. 72,907. (No model.)

*To all whom it may concern:*

Be it known that I, GEORGE O. MORRIS, a citizen of the United States, residing at Moline, in the county of Rock Island and State of Illinois, have invented new and useful Improvements in Devices for Automatically Inflating Pneumatic Tires, of which the following is a specification.

The invention relates to devices for automatically inflating pneumatic tires of vehicles while in motion.

The object of the invention is to provide a device of this character which shall be simple of construction, durable in use, comparatively inexpensive of production, easily applied, and by means of which when the tire has been inflated to the proper or predetermined degree further inflation will automatically cease and will not be resumed until the air begins to escape from the tire.

With these and other objects in view the invention consists of certain novel features of construction, combination, and arrangement of parts, which will be hereinafter more fully described, and particularly pointed out in the appended claim.

In the accompanying drawings, Figure 1 is a side elevation of my invention, showing it applied to a front wheel and front fork of a bicycle, fragments only of the wheel and fork being illustrated. Fig. 2 is a similar view showing the invention applied to the rear wheel and rear forks of a bicycle. Fig. 3 is an enlarged detail view of the device removed. Fig. 4 is a detail side elevation, on an enlarged scale, of the eccentric and its strap and a portion of the pump-rod; and Fig. 5 is a longitudinal vertical sectional view through the pump.

A denotes the pneumatic-tired wheel; B, its hub; C, its spokes; D, its rim, and E the usual valve-nipple. These parts may be of any well-known or approved construction, and as they in themselves form no part of the present invention a detailed description is not thought to be necessary.

1 denotes the barrel of an air-pump, having a removable cap 2 at its upper end, formed with one or more air-inlet openings 3, and 4 denotes a cap secured to the lower end of the barrel and provided with a screw-nipple 5, adapted for connection with the valve-nipple 3 in the usual manner.

6 denotes the pump-plunger, and 7 the pump-rod connected thereto and having its free end projecting through the cap 2 and offset at 8 for obvious reasons and formed with an eccentric strip or yoke 9. The plunger 6 is provided with a tubular valve-casing 10, having a screw-cap 11 at its upper end, formed with an air-outlet opening 12, while the lower end of the tubular casing projects through the plunger and communicates with the space in the barrel below the plunger.

13 denotes a valve which engages a seat 14, formed in the tubular valve-casing, and is provided with a guide-stem 15. This valve is held normally to its seat by a coiled spring 16, which is confined between the upper face of the valve and the cap 11.

17 denotes an eccentric having a portion of its rim broken away, as shown at 18, and provided with a curved surface 19, which is adapted to be fixedly secured to the hub of the wheel between its spokes. The eccentric is provided with an arch-shaped brace 20, which is formed with a recess 21 to engage the axle between the end of the hub and one of the forks and resist endwise strain of the eccentric in a longitudinal direction on the hub, as well as in a leaning direction with respect to the hub. The eccentric is preferably provided with an annular grooved rim to receive the strap 9 and hold it from accidental disengagement therefrom.

In operation, assuming the wheel to be in motion, its rotation will, through the instrumentality of the strap and eccentric, reciprocate the plunger in the pump-barrel. This reciprocation of the plunger will inflate the tire in the usual manner; but the instant the pressure within the tire exceeds the tension of the spring 10 the valve in the nipple E will remain closed, so that the air forced through the nipple 5 will be compressed and will unseat the valve 13 and allow the air confined between the nipple 5 and the nipple E to escape through the outlet 12 in the valve-casing and out through the openings 3 to the atmosphere. This continues until the air-pressure within the tire decreases and is of less force than the tension of the spring.

Then the spring reseats the valve 13, and the air forced from the nipple 5 by the plunger 6 will unseat the valve of the nipple E and the tire thus be recharged or inflated.

From the foregoing description, taken in connection with the accompanying drawings, the construction, mode of operation, and advantages of the invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

The combination with one of the forks, the axle, the pneumatic-tired wheel and its hub of a bicycle; of a pump connected to the valved nipple of the wheel, a segmental eccentric-strap secured to the pump-rod, an eccentric having a portion of its rim broken away and provided with a segmental portion fixedly secured to the hub, said eccentric being engaged by said strap, and an arch-shaped brace fixed to the eccentric and located to one side of the broken rim portion of said eccentric and said segmental portion and having a recess which is engaged by the axle between one end of the hub and one of the forks and thereby relieving the eccentric, at its point of connection with the hub, of undue strain, substantially in the manner set forth.

In testimony whereof I have hereunto set my hand in the presence of two subscribing witnesses.

GEORGE O. MORRIS.

Witnesses:
JUDSON D. METZGAR,
GRACE BROWN.

Correction in Letters Patent No. 690,601.

It is hereby certified that the name of the last-mentioned assignee in Letters Patent No. 690,601, granted January 7, 1902, upon the application of George O. Morris, of Moline, Illinois, for an improvement in "Devices for Automatically Inflating Pneumatic Tires," was erroneously printed "George H. McKinsey," whereas said name should have been printed *George H. McKinley;* and that the said Letters Patent should be read with this correction therein that the same may conform to the record of the case in the Patent Office.

Signed, countersigned, and sealed this 21st day of January, A. D., 1902.

[SEAL.]

F. L. CAMPBELL,
*Assistant Secretary of the Interior.*

Countersigned:
F. I. ALLEN,
*Commissioner of Patents.*